United States Patent Office 2,983,708
Patented May 9, 1961

2,983,708

POLYESTERS OF 3-HYDROXY-4(PHENYLCARBONYL)PHENOXYACETIC ACID AND ORGANIC PLASTICS STABILIZED THEREWITH

Gerald R. Lappin, Kingsport, Tenn., assignor to Eastman Kodak Company, Rochester, N.Y., a corporation of New Jersey No Drawing. Filed July 7, 1958, Ser. No. 746,633

18 Claims. (Cl. 260—45.85)

This invention relates to a new group of compounds that have particular utility for stabilizing organic plastic materials normally subject to photodegradation. Preferred embodiments of the invention concern the stabilization of poly-α-olefin compositions, particularly polyethylene compositions, as well as cellulose acetate compositions and polyesters of 1,4-cyclohexanedimethanol and terephthalic acid.

Many common organic plastic materials of commerce are subject to photodegradation. Photodegradation of organic plastic materials is evident by telltale properties which are imparted to the particular plastic material such as change or acquisition of odor or color, surface cracking, brittleness, loss of dielectric properties, loss of tensile strength, and other properties deleterious to the utility of the organic plastic material. Accordingly, it is common practice to incorporate into organic plastic materials subject to photodegradation various materials to retard or inhibit the formation of such undesirable properties.

Various derivatives of 2-hydroxybenzophenone are known to be effective light stabilizers for many plastic compositions. However, many commercial additives of this type have disadvantageous properties and limited utility. In particular, many derivatives of 2-hydroxybenzophenone are not sufficiently compatible with such plastics as polyethylene, for example, to allow their use in this medium. Another disadvantage is the relatively low molecular weight of commercial derivatives of 2-hydroxybenzophenone, these molecular weights generally range from about 200 to 250. Such additives to fibers and thin films of plastic materials are particularly susceptible to volatization and leaching. The compound, 4-dodecyloxy-2-hydroxybenzophenone, has a higher molecular weight and has compatibility with polyethylene. However, this compound is still of relatively low molecular weight and the stabilizing 2-hydroxybenzophenone moiety has been substantially diluted by the long-chain alkoxy radical attached thereto. Accordingly, it would be highly desirable to have a relatively high molecular weight compound having the 2-hydroxybenzophenone moiety diluted to a minimum degree.

It is an object of this invention to provide a new group of compounds suitable for stabilizing organic plastic materials normally subject to photodegradation.

It is another object of this invention to provide a novel group of relatively high molecular weight stabilizers for organic plastic materials, which stabilizers contain the 2-hydroxy-benzophenone moiety diluted to a minimum degree.

It is another object of this invention to provide novel compounds having a plurality 2-hydroxybenzophenone moieties.

It is another object of this invention to provide novel poly-α-olefin compositions of improved stability to ultraviolet light.

It is another object of this invention to provide novel deactivators of ultraviolet light that are compatible with normally solid polyethylene compositions.

It is another object of this invention to provide new normally solid cellulose acetate compositions of improved stability to ultraviolet light.

It is another object of this invention to provide new compositions comprising polyesters of 1,4-cyclohexanedimethanol and terephthalic acid of improved stability to ultraviolet light.

It is likewise an object of this invention to provide novel normally solid, organic plastic materials in fiber and thin film form containing a stabilizer resistance to volatization and leaching therefrom.

Other objects of the invention will be apparent from the description and claims which follow:

The novel compounds of the present invention are hydroxyl-containing esters having the following structural formula:

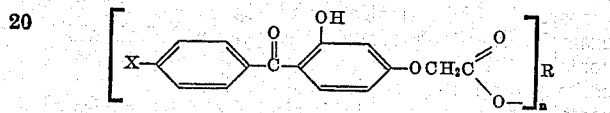

wherein X is hydrogen or a lower alkoxy radical having 1 to 4 carbon atoms, R is a polyvalent aliphatic radical derived from a primary or secondary polyhydric alcohol and $n$ is an integer of at least 2 and not more than the number of hydroxyl radicals of the polyhydric alcohol. The compounds of the invention can be prepared from 2,4-dihydroxybenzophenone and 2,4-dihydroxy-4'-alkoxybenzophenone by reacting an alpha-halogen acetic acid with the 2,4-dihydroxybenzophenone compound to form 3-hydroxy-4-(phenylcarbonyl) phenoxyacetic acid or 3-hydroxy-4-(4-alkoxyphenyl-carbonyl) phenoxyacetic acid, which acid is then esterified with a polyhydric alcohol to produce the present esters. This series of reactions can be illustrated by the following equation:

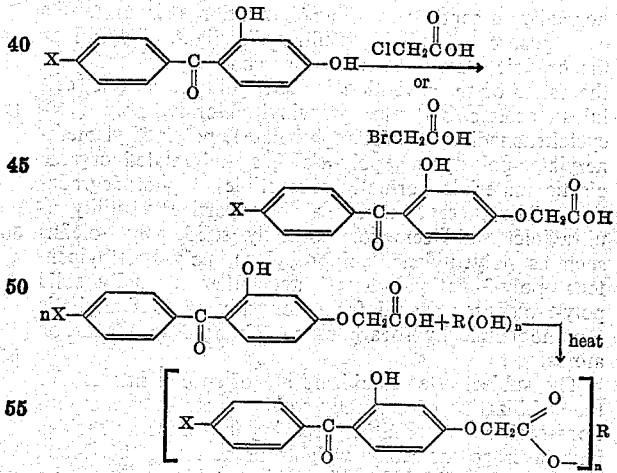

The 4-hydroxyl group of the 2,4-dihydroxybenzophenone compound is typically esterified with an equal mole proportion of chloroacetic acid by refluxing in acetone for about 12 hours in the presence of about a half mole proportion of potassium carbonate. The resulting 3-hydroxy-4-(phenylcarbonyl) phenoxyacetic acid or 3-hydroxy-4-(4-alkoxyphenylcarbonyl) phenoxyacetic acid is then esterified with a suitable polyhydric alcohol, a typical reaction period being about 2 hours at a temperature of 200° to 250° C.

Suitable aliphatic polyhydric alcohols used in preparing the present esters have 2 to 10 carbon atoms and contain 2 to 6 and preferably 2 to 4 hydroxyl groups. Suitable polyhydric alcohols have the formula, $R(OH)_n$, wherein R is an aliphatic radical, preferably a hydrocarbon, having 2 to 10 carbon atoms and $n$ is an integer of from 2 to 6. Preferably all of the hydroxyl radicals of the subject polyhydric alcohols are primary alcohols. However, alcohols containing secondary hydroxyl radicals can also be used. Alcohols containing tertiary hydroxyl radicals are not employed in the preparation of the present compounds. Typical polyhydric alcohols that can be employed in the preparation of the present esters are 1,2-ethanediol, 1,3-n-propanediol, 1,4-n-butanediol, 1,5-n-pentanediol, 1,10-n-decanediol, 1,3-diol-2,2-dimethylpropane, and related hydrocarbon diols of the formula $HO(R)_nOH$, as well as glycerol, sorbitol, 2,2'-dihydroxyethyl ether, pentaerylthritol, 1,4-cyclohexanedimethanol, and related primary and secondary polyhydric alcohols having 2 to 10 carbon atoms and 2 to 6 hydroxyl radicals.

In preparing the present compounds the hydroxyl radical in the 2-position of the benzophenone moiety remains unesterified. The molecular weight of the present compounds depends upon the nature of the polyhydric alcohol employed, polyhydric alcohols containing larger numbers of hydroxyl radicals can be used to prepare the higher molecular weight compounds. For example, an ester prepared from pentaerythritol, which contains 4 hydroxyl radicals, and 3-hydroxy-4-(phenyl carbonyl) phenoxy acetic acid could be a compound containing one moiety of this alcohol and 4 moieties of this phenoxy acetic acid derivative if the alcohol is fully esterified. The esters of the invention are either diesters or polyesters or mixtures thereof. The simplest compound of the invention is an ester of 3-hydroxy-4-(phenyl carbonyl) phenoxy acetic acid and 1,2-ethanediol, this compound having a molecular weight of about 570. Hence, the compounds of the invention have molecular weights of at least 570 and generally molecular weights in the range of 570 to about 1500 or higher depending upon the nature of the polyhydric alcohol, the degree of esterification, and the substituent in the 4' position in the 2-hydroxybenzophenone moiety.

The present hydroxybenzophenone esters have utility as stabilizers for normally solid organic plastic materials normally susceptible to photodegradation such as results on exposure to sunlight or ultravoilet light. Typical of the organic plastic materials that can be stabilized with the esters of the invention include cellulose acetate, cellulose acetate butyrate, polyvinyl chloride, poly (1,4-cyclohexanedimethanol terephthalate), polymethyl methacrylate, polystyrene, poly-α-olefins and related organic plastic materials normally susceptible to photodegradation. The present stabilizers have particular utility as ultraviolet stabilizers for normally solid poly-α-olefins such as polyethylene, polypropylene, poly-4-methylpentene, poly-3-methyl-butene-1 and other normally solid poly-α-olefins prepared from normally gaseous aliphatic α-monoolefinic hydrocarbons containing 2 to 10 carbon atoms.

The subject ester stabilizers are of special interest for the stabilization of normally solid polyethylene compositions such as are used in preparing thin films and which have average molecular weights of at least 15,000 and usually at least 20,000. The subject stabilizers have particularly good compatibility and permanence in such polyethylene compositions. Many 2-hydroxybenzophenone stabilizers that are effective for other well known polymers, resins and polyesters are ineffective in polyethylene due to their incompatibility therewith. For example, if 2,4-dihydroxybenzophenone is compounded in polyethylene at even a 0.5% by weight level, exudation of the 2,4-dihydroxybenzophenone begins at once and the surface of the polyethylene is covered with a film of the crystals of the additive in a very short while.

The present stabilizers can be employed in a wide range of proportions to stabilize organic plastic materials against photodegradation, the optimum amount used varying with the particular plastic material being stabilized. Amounts of the present stabilizer of at least 0.01% by weight are usually used in most organic plastic materials, with about 0.01% to 10% by weight being generally used in most organic plastic materials, and with amounts of from about 0.5% to 2.5% by weight being preferably used in polyethylene.

The present stabilizers can be incorporated into organic plastic materials by conventional methods, the methods used varying with the organic plastic material being stabilized. The stabilizer can be incorporated into the various plastic substrates by dry blending, melt blending, deposition from solvent, milling on heated rolls and related conventional methods commonly used for blending and incorporating stabilizers into organic plastic materials.

As noted above, the present stabilizers have higher molecular weights than conventional 2-hydroxybenzophenone stabilizer compounds. Such higher molecular weights lend to the present staibilizers reduced volatility and reduced susceptibility to leaching from plastics as compared with known 2-hydroxybenzophenone compounds. Furthermore, the higher molecular weight of the present compounds is obtained without a substantial reduction of the effective 2-hydroxybenzophenone moiety with an inert long-chain. Thus, on a weight basis, the stabilizers of the invention are more effective than previously disclosed stabilizers containing a 2-hydroxybenzophenone moiety. For example, the 2-hydroxybenzophenone stabilizing moiety of the effective polyethylene stabilizer, 4-dodecyloxy hydroxybenzophenone, comprises only 53% by weight of this compound, while the present stabilizer compounds contain up to about 70% by weight of the effective 2-hydroxybenzophenone stabilizing moiety. Hence, the stabilizers of the invention have relatively high molecular weights which lend to them greater permanence in normally solid organic plastic materials, and which permanence is attained without a dilution of stabilization properties.

The invention is illustrated by the following examples of preferred embodiment thereof.

EXAMPLE 1

Several typical 2-hydroxybenzophenone-containing esters of the invention were prepared by reacting at least a two mole proportion of an acid having the formula:

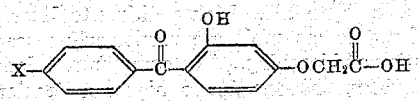

wherein X was hydrogen or methoxy, with a one mole proportion of a polyhydric alcohol, the number of mole proportions of acid being equal to the number of hydroxyl radicals in the alcohol. The reactants were heated at about 200° C. for two hours and thereafter the temperature of the reaction mixture was raised to 250° C. and the reactants allowed to react for 15 more minutes. The resulting reaction mixture was then cooled to room temperature and the solid 2-hydroxybenzophenone-containing esters recrystallized from a 50%–50% acetone-methanol mixture. The resulting products had the following formula:

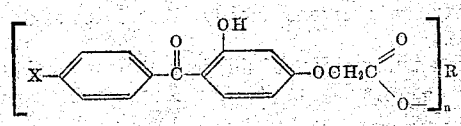

Table 1 below sets out the various compounds prepared having various substituents for X, R and $n$ in the above formula, as well as the melting points and carbon-hydrogen analyses for the prepared compounds.

Table 1

| X | n | R | M.P., °C. | Calc'd. C, percent | Calc'd. H, percent | Found C, percent | Found H, percent |
|---|---|---|---|---|---|---|---|
| H | 2 | $-CH_2CH_2-$ | 148–150 | 67.4 | 4.57 | 67.3 | 4.49 |
| H | 2 | $-CH_2CH_2CH_2-$ | 131–133 | 68.3 | 4.83 | 68.4 | 4.91 |
| H | 2 | $-CH_2(CH_2)_2-CH_2-$ | 123–125 | 68.4 | 5.02 | 68.3 | 5.08 |
| H | 2 | $-CH_2(CH_2)_3-CH_2-$ | 114–116 | 68.6 | 5.22 | 68.5 | 5.17 |
| H | 2 | $-CH_2(CH_2)_8-CH_2-$ | 120–124 | 70.0 | 6.15 | 69.9 | 6.10 |
| H | 2 | $(-CH_2CH_2)_2O$ | 126–128 | 66.5 | 4.89 | 66.3 | 4.92 |
| H | 2 | $-H_2C-\langle\rangle-CH_2-$ | 140–142 | 70.0 | 5.53 | 69.8 | 5.61 |
| H | 2 | $-CH_2-C(CH_3)_2-CH_2-$ | (1) | 68.6 | 5.22 | 68.1 | 5.01 |
| H | 3 | $-CH_2-CH(CH_2-)-CH_2-$ | (1) | 67.5 | 4.46 | 67.2 | 4.52 |
| H | 4 | $-CH_2-C(CH_2-)_2-CH_2-$ | (2) | 67.6 | 4.51 | 67.2 | 4.47 |
| $CH_3O$ | 2 | $-CH_2CH_2-$ | 172–175 | 64.8 | 4.76 | 64.7 | 4.73 |
| $CH_3O$ | 2 | $-CH_2(CH_2)_3-CH_2-$ | 132–136 | 66.0 | 5.36 | 65.8 | 5.34 |
| $CH_3O$ | 4 | $-CH_2-C(CH_2-)_2-CH_2-$ | (2) | 65.0 | 3.92 | 64.8 | 4.01 |

[1] Obtained as a very viscous liquid.
[2] Obtained as an amorphous solid.

The above prepared esters were tested as stabilizers against photodegradation in several normally solid organic plastic materials. Examples illustrating such a use for these esters is set out in Examples 2 to 4.

EXAMPLE 2

A. Polyethylene samples containing several of the ester stabilizers of the invention, as well as samples containing no additive and 2,4-dihydroxybenzophenone for comparative purposes, were subjected to an outdoor weathering test. The various additives were incorporated into polyethylene having an average molecular weight of about 27,600 and a density of 0.919 at a concentration of about 1% by weight of the polyethylene by milling on heated rollers in accordance with usual practice. Thereafter the polyethylene was compression molded into sheets 60 mils thick. Samples of the resulting sheets containing the various additives and the control sample containing no additive were exposed to outdoor weathering on a rack facing south at an angle with the horizontal of 36.5° at Kingsport, Tennessee. The carbonyl content of the various samples was determined before exposure and after 10 weeks of exposure by measurement of infrared absorption in the $5.82\mu$ region. An arbitrary carbonyl unit was given to the carbonyl increase for comparative purposes. The determination of the carbonyl increase gives an early and reliable indication of photo-oxidation in poly-α-olefins. The carbonyl increase in the resulting samples is set out in Table 2 below. Reference is made to the following two publications concerning the determination of carbonyl content by infrared measurements: Rugg, Smith and Bacon, J. Polymer Sci., 13, 535 (1954) and Cross, Richards and Willis, Discussions Faraday Soc. No. 9, 235 (1950). Additionally, the amount of exudation of the various additives, indicating the compatibility thereof in polyethylene, was observed and set out in Table 2. The stabilizers of the invention employed to acquire the data set out in Table 2 can be represented by the following formula:

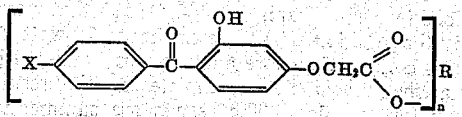

Table 2

| Additive | Exudation | Increase in carbonyl content after 10 weeks' exposure, arbitrary units |
|---|---|---|
| None | | 21.2 |
| 2,4-dihydroxybenzophenone | Much | 1.8 |
| X=H, R=$-CH_2CH_2-$, n=2 | None | 0.0 |
| X=H, R=$-CH_2(CH_2)_2-CH_2-$, n=2 | do | 0.0 |
| X=H, R=$-CH_2(CH_2)_3CH_2-$, n=2 | do | 0.0 |
| X=H, R=$-CH_2(CH_2)_8CH_2-$, n=2 | do | 0.0 |
| X=H, R=$(-CH_2CH_2)_2O$, n=2 | do | 0.0 |
| X=H, R=$-CH_2-C(CH_3)_2-CH_2-$, n=2 | do | 0.0 |
| X=H, R=$-CH_2-\langle\rangle-CH_2-$, n=2 | do | 0.0 |
| X=H, R=$-CH_2-C(CH_2-)_2-CH_2-$, n=4 | do | 0.0 |
| X=$CH_3O$, R=$-CH_2CH_2-$, n=2 | do | 0.0 |
| X=$CH_3O$, R=$-CH_2-C(CH_2-)_2-CH_2-$, n=4 | do | 0.0 |

B. As noted above, the stabilizers of the invention are all compatible with polyethylene. Such compatibility with polyethylene is not shared by many other conventional stabilizers containing the 2-hydroxybenzophenone moiety. Several stabilizers at a 1% by weight level were incorporated into polyethylene by milling on heated rollers, compression molded into 60 mil sheets of polyethylene and exposed to outdoor weathering as described above. After the exposure to the weathering, the surfaces of the respective samples were examined for possible exudation of the stabilizer additive. Table 3 below summarizes the results of the compatibility tests of the various 2-hydroxybenzophenones in the polyethylene samples.

Table 3

| Additive | Exudation |
|---|---|
| 2,2',4,4'-tetrahydroxybenzophenone | Much. |
| 2,2'-dihydroxy-4,4'-dimethoxybenzophenone | Do. |
| 2,4-dihydroxy-5-n-hexylbenzophenone | Do. |
| 2-hydroxy-4,4'-dimethoxybenzophenone | Do. |
| 2-hydroxy-5-methylbenzophenone | Do. |
| 2,4-dihydroxy-5-n-dodecyloxybenzophenone | Do. |

EXAMPLE 3

A polyester was prepared by reacting a 0.6 mole proportion of dimethyl terephthalate, a 0.2 mole proportion of succinic anhydride and a 1.0 mole proportion of 1,4-cyclohexane dimethanol in accordance with the method described in Example 1 of copending Kibler application, U.S. Serial No. 554,639, filed December 22, 1955, now U.S. Patent No. 2,901,466. Several samples of the resulting polyester and several stabilizers of the invention at a 1% by weight level based on the polyester were dissolved in tetrachloroethane and 3 mil films were cast from this dope. The resulting films were then cut into approximately 2½ by ½ inch samples and exposed for varying lengths of time in an Atlas Twin-Arc Weather-Ometer described in Anal. Chem., 25, 460 (1953) that was modified by the addition of 12 Westinghouse 20-watt fluorescent sun lamps. Exposure damage was evaluated by observing when cracking and complete breaking resulted on creasing the samples. The results are summarized on Table 4 below. The stabilizers of the invention employed to acquire the data set out in Table 4 can be represented by the following formula:

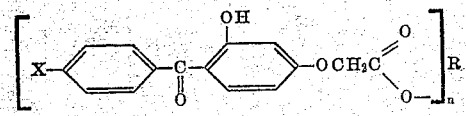

Table 4

| Additive | Exposure (hrs.) to— | |
|---|---|---|
| | Crack on creasing | Break on creasing |
| None | 9 | 18 |
| n=2, X=H, R=—CH₂CH₂— | 300 | 600 |
| n=2, X=H, R=—CH₂(CH₂)₂—CH₂— | 300 | 500 |
| n=4, X=H, R=—CH₂—C(CH₂—)(CH₂—)—CH₂— | 400 | 900 |
| n=2, X=CH₃O, R=—CH₂CH₂— | 300 | 500 |

EXAMPLE 4

Several of the hydroxyl-containing esters of the invention were tested as stabilizers in cellulose acetate fibers. The various stabilizers were added at a level of 1% by weight based on the weight of the cellulose acetate, the cellulose acetate having an acetyl content of about 39% by weight, in an acetone dope thereof. Thereafter, the resulting mixture was spun from the acetone into about 55 denier fibers. The resulting fibers, as well as comparable fibers containing no additive, were exposed for 300 hours in a modified Atlas Twin-Arc Weather Ometer as described in Example 3 above. The tensile strengths of the resulting fibers were determined after exposure and compared with the original tensile strengths before exposure. The results are summarized in Table 5 below in terms of percent of original tensile strength retained. The stabilizers of the invention employed to acquire the data set out in Table 5 can be represented by the following formula:

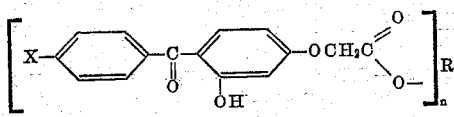

Table 5

| Additive | Retention of original tensile strength, Percent |
|---|---|
| None | 42 |
| X=H, R=—CH₂(CH₂)₃—CH₂—, n=2 | 85 |
| X=H, R=—CH₂—C(CH₃—)(CH₂—)—CH₂—, n=4 | 89 |
| X=CH₃O, R=—CH₂(CH₂)₃—CH₂—, n=2 | 86 |

Thus, the present invention provides a new and useful group of 2-hydroxybenzophenone-containing esters. These novel esters are effective stabilizers for organic plastic materials normally subject to photodegradation. In addition, the 2-hydroxybenzophenone-containing esters of the invention can be prepared in relatively high molecular weights with a minimum of dilution of the 2-hydroxybenzophenone moiety. Such esters, because of their high molecular weights, have greater permanence in normally solid organic plastic materials than conventional 2-hydroxybenzophenones.

Although the invention has been described in detail with reference to certain preferred embodiments thereof, it will be understood that variations and modifications can be effected within the spirit and scope of the invention as described hereinabove and as defined in the appended claims.

I claim:

1. A composition of matter comprising a normally solid organic plastic material normally susceptible to photodegradation containing dispersed therein at least .01% by weight of a hydroxyl-containing ester having the formula:

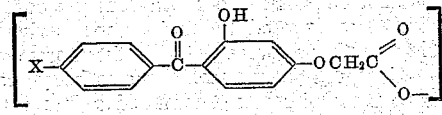

wherein X is selected from the group consisting of hydrogen and lower alkoxy radicals having 1 to 4 carbon atoms, R is a polyvalent aliphatic radical having 2 to 10 carbon atoms derived from a polyhydric alcohol selected from the group consisting of primary alcohols and secondary alcohols having 2 to 6 hydroxy radicals, and $n$ is an integer equal to the number of hydroxyl radicals of said polyhydric alcohol.

2. A composition of matter as described in claim 1 wherein the polyhydric alcohol is selected from the group consisting of 1,2-ethanediol, 1,3-n-propanediol, 1,4-n-butanediol, 1,5-n-pentanediol, 1,10-n-decanediol, 1,4-cyclohexanedimethanol, glycerol, 2,2'-dihydroxyethyl ether, 1,3-diol-2,2-dimethylpropane and pentaerythritol.

3. A composition as described in claim 1 wherein the organic plastic material is cellulose acetate.

4. A composition as described in claim 1 wherein the organic plastic material is a polyester of 1,4-cyclohexanedimethanol and terephthalic acid.

5. A composition as described in claim 1 wherein the organic plastic material is a poly-α-olefin composition.

6. A composition as described in claim 1 wherein the plastic material is polyethylene.

7. A composition of matter comprising a normally solid organic plastic material selected from the group consisting of polyethylene, cellulose acetate and a polyester of 1,4-cyclohexanedimethanol and terephthalic acid, containing dispersed therein .01% to 10% by weight of a hydroxyl-containing ester having the formula:

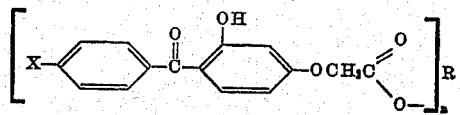

wherein X is selected from the group consisting of hydrogen and lower alkoxy radicals having 1 to 4 carbon atoms, R is a polyvalent aliphatic radical having 2 to 10 carbon atoms and derived from a polyhydric alcohol selected from the group consisting of primary alcohols and secondary alcohols having the formula $R(OH)_n$, and $n$ in the said hydroxyl-containing ester formula and $n$ in the said polyhydric alcohol formula are integers of 2 to 4 and are equal integers.

8. A hydroxyl-containing ester having the formula:

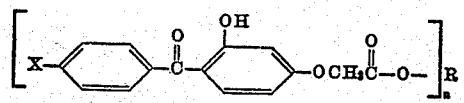

wherein X is selected from the group consisting of hydrogen and lower alkoxy radicals having 1 to 4 carbon atoms, R is a polyvalent aliphatic radical having 2 to 10 carbon atoms derived from a polyhydric alcohol selected from the group consisting of primary alcohols and secondary alcohols having 2 to 6 hydroxyl radicals, and $n$ is an integer equal to the number of hydroxyl radicals of said polyhydric alcohol.

9. A hydroxyl-containing ester as described in claim 8 wherein the polyhydric alcohol is selected from the group consisting of 1,2-ethanediol, 1,3-n-propanediol, 1,4-n-butanediol, 1,5-n-pentanediol, 1,10-n-decanediol, 1,4-cyclohexanedimethanol, glycerol, 2,2′-dihydroxyethyl ether, 1,3-diol-2,2-dimethylpropane and pentaerythritol.

10. A composition of matter comprising a normally solid organic plastic material normally susceptible to photodegradation containing dispersed therein .01% to 10% by weight of a hydroxyl-containing ester having the formula:

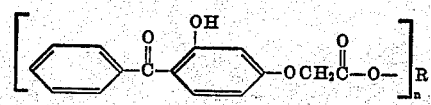

wherein R is a polyvalent hydrocarbon radical having 2 to 10 carbon atoms and derived from a polyhydric primary alcohol having the formula $R(OH)_n$, and $n$ in the said hydroxyl-containing ester formula and $n$ in the said polyhydric primary alcohol formula are integers of 2 to 4 and are equal integers.

11. A composition of matter comprising a normally solid organic plastic material normally susceptible to photodegradation containing dispersed therein .01% to 10% by weight of a hydroxyl-containing ester having the formula:

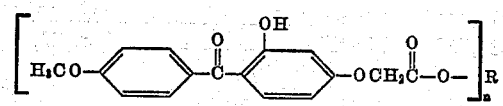

wherein R is a polyvalent hydrocarbon radical having 2 to 10 carbon atoms and derived from a polyhydric primary alcohol having the formula $R(OH)_n$, and $n$ in the said hydroxyl-containing ester formula and n in the said polyhydric primary alcohol formula are integers of 2 to 4 and are equal integers.

12. A hydroxyl-containing ester having the formula:

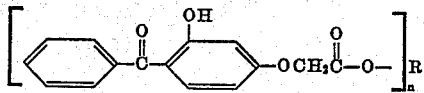

wherein R is a polyvalent hydrocarbon radical having 2 to 10 carbon atoms and derived from a polyhydric primary alcohol having the formula $R(OH)_n$, and $n$ in the said hydroxyl-containing ester formula and $n$ in the said polyhydric primary alcohol formula are integers of 2 to 4 and are equal integers.

13. A hydroxyl-containing ester having the formula:

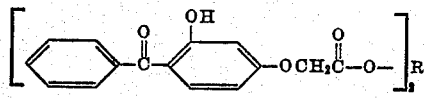

wherein R is a divalent hydrocarbon radical having 2 to 10 carbon atoms and derived from a primary dihydric alcohol.

14. A hydroxyl-containing ester having the formula:

15. A hydroxyl-containing ester having the formula:

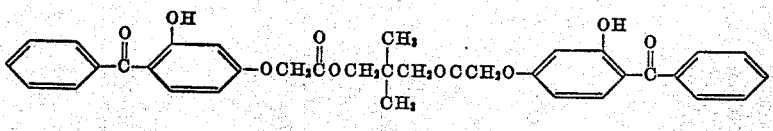

16. A hydroxyl-containing ester having the formula:

wherein R is a monovalent radical having the formula:

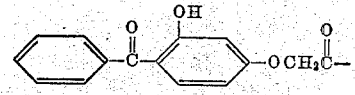

17. A hydroxyl-containing ester having the formula:

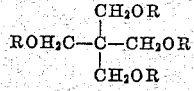

wherein R is a monovalent radical having the formula:

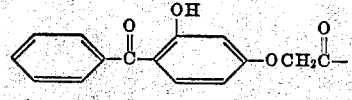

18. A hydroxyl-containing ester having the formula:

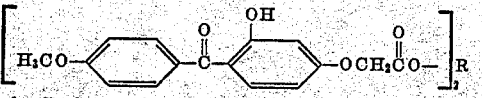

wherein R is a divalent hydrocarbon having 2 to 10 carbon atoms and derived from a primary dihydric alcohol.

References Cited in the file of this patent
UNITED STATES PATENTS

| | | |
|---|---|---|
| 2,811,461 | Meyer et al. | Oct. 29, 1957 |
| 2,831,768 | Merrill | Apr. 22, 1958 |

OTHER REFERENCES

Chevassus: La Stabilisation Des Chlorures De Polyvinyl, copyright 1957, Les Editions Amphora, Paris, France, pages 80–87.

Beilstein: Handbuch Der Organischem Chemie Vierte Auflage, vol. X, copyright 1927, page 1042.